United States Statutory Invention Registration [19]

[11] Reg. Number: H693

Leupold [43] Published: Oct. 3, 1989

[54] PYX TWISTER WITH SUPERCONDUCTING CONFINEMENT

[75] Inventor: Herbert A. Leupold, Eatontown, N.J.

[73] Assignee: The United States of America as represented by the Secretary of the Army, Washington, D.C.

[21] Appl. No.: 316,374

[22] Filed: Feb. 24, 1989

[51] Int. Cl.[4] ..... H01F 7/02; H01J 25/22

[52] U.S. Cl. ..... 335/216; 335/306; 315/5.28; 315/5.35; 505/1

[58] Field of Search ..... 335/210, 216, 306; 315/5.26, 5.28, 5.34, 5.35; 505/1

*Primary Examiner*—Thomas H. Tarcza
*Assistant Examiner*—Linda J. Wallace
*Attorney, Agent, or Firm*—Sheldon Kanars; John K. Mullarney

[57] ABSTRACT

Permanent magnet structures are fabricated from a plurality of hollow cylindrical flux sources, the sources displaced radially from each other progressively along the structures' elongate axes so as to produce a heliform magnetic field extending centrally in a passage through the structures. Superconducting plates are interspersed between adjacent flux sources and also cover the end faces of the array.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PYX TWISTER WITH SUPERCONDUCTING CONFINEMENT

The invention described herein may be manufactured, used, and licensed by or for the Government for governmental purposes without the payment to me of any royalties thereon.

TECHNICAL FIELD

The present invention relates to the utilization of permanent magnets to produce helically oriented magnetic fields which are particularly useful in high power broad-band radiation sources for microwave and millimeter-wave radars.

BACKGROUND OF THE INVENTION

Twister designed magnetic field generators have been provided by current carrying coils of very high amperage adapted to produce helically varying transverse magnetic fields of the magnetization desired. In recent developments, notably U.S. Pat. No. 4,764,773, incorporated herein by reference, permanent magnets have been designed and arranged in certain specific ways to form structures which produce desirable helical or "twisted" fields obviating the need for commonly used current carrying coils with their attendant weight and space problems. These structures are based upon the hollow cylindrical flux source (HCFS) principle described by K. Halbach in "Proceedings of the Eighth International workshop on Rare Earth Cobolt Permanent Magnets", Univ. of Dayton, Dayton, Ohio, 1985 (pp. 123–136). A HCFS, also referred to sometimes as a "magic ring", is essentially a cylindrical permanent magnet shell that produces an internal magnetic field which is relatively constant in magnitude. The field, which is perpendicular to the axis of the cylinder, (transverse) possesses a strength which can be greater than the remanence of the magnetic material from which the ring is made.

Ideally, the HCFS is an infinitely long annular cylindrical shell with a circular cross section, which produces an intense magnetic field in its interior working space. No magnetic flux extends to the exterior of the ring structure (except at ends of a finite cylinder). A HCFS is not limited to the ideal cylindrical structure, but may be represented by octagonal, sixteen sided, thirty-two-sided, and even higher order polygonal-sided structures which approximate the ideal HCFS structure.

In "twister" structures there also exists an undesirable longitudinal component of the magnetic field in combination with the transverse component, arising from the high helical motion, i.e. "frequency". As the frequency increases, the longitudinal component increases, weakening the transverse component. Therefore, it has been of increasing concern to produce stronger transverse magnetic fields in "twister" configurations.

SUMMARY OF THE INVENTION

It is therefore an object of this invention to provide a permanent magnet structure possessing a high transverse magnetic field strength with little or no longitudinal field strength.

It is a further object of this invention to provide a permanent magnet structure possessing a high transverse magnetic field at high operating frequency.

It is another object of this invention to provide a permanent magnet structure with minimal internal field distortion and minimal external flux leakage.

It is still another object of this invention to provide a permanent magnet structure with uniform interior magnetic flux.

The above and other objects are achieved in accordance with the present invention, which makes advantageous use of the HCFS twister structure uniquely combined with superconducting plates or sheets.

In an embodiment of the invention, a multiplicity of similarly magnetized octagonal hollow cylindrical flux source structures, each having a generally disposed hole therethrough, are arranged concentrically on an elongate axis with said holes defining an elongate axial passage extending through said structure, each octagonal structure rotated radially on the axial center line so as to displace its magnetization along a helical locus, thus giving the entire array the capacity to define a twisted or helically oriented magnetic field through the axially extending center passage. Superconducting sheets are interspersed between adjacent octagonal structures and also cover the end faces of the array. The superconducting sheets abutting the end faces of each octagonal structure confine the flux or magnetic filed to the interior of each structure, establish a uniform field in the interior, and isolate each structure from its nearest neighbors thereby preventing distortion of the field by neighbor-induced counterfields. Furthermore, high frequency may be maintained without the presence of a longitudinal magnetic field due to this isolation.

BRIEF DESCRIPTION OF THE DRAWINGS

The objects, features, and details of the invention will become more readily apparent in light of the detailed description and disclosure in connection with the accompanying drawings wherein.

DETAILED DESCRIPTION OF THE INVENTION

Figures 1, 2:
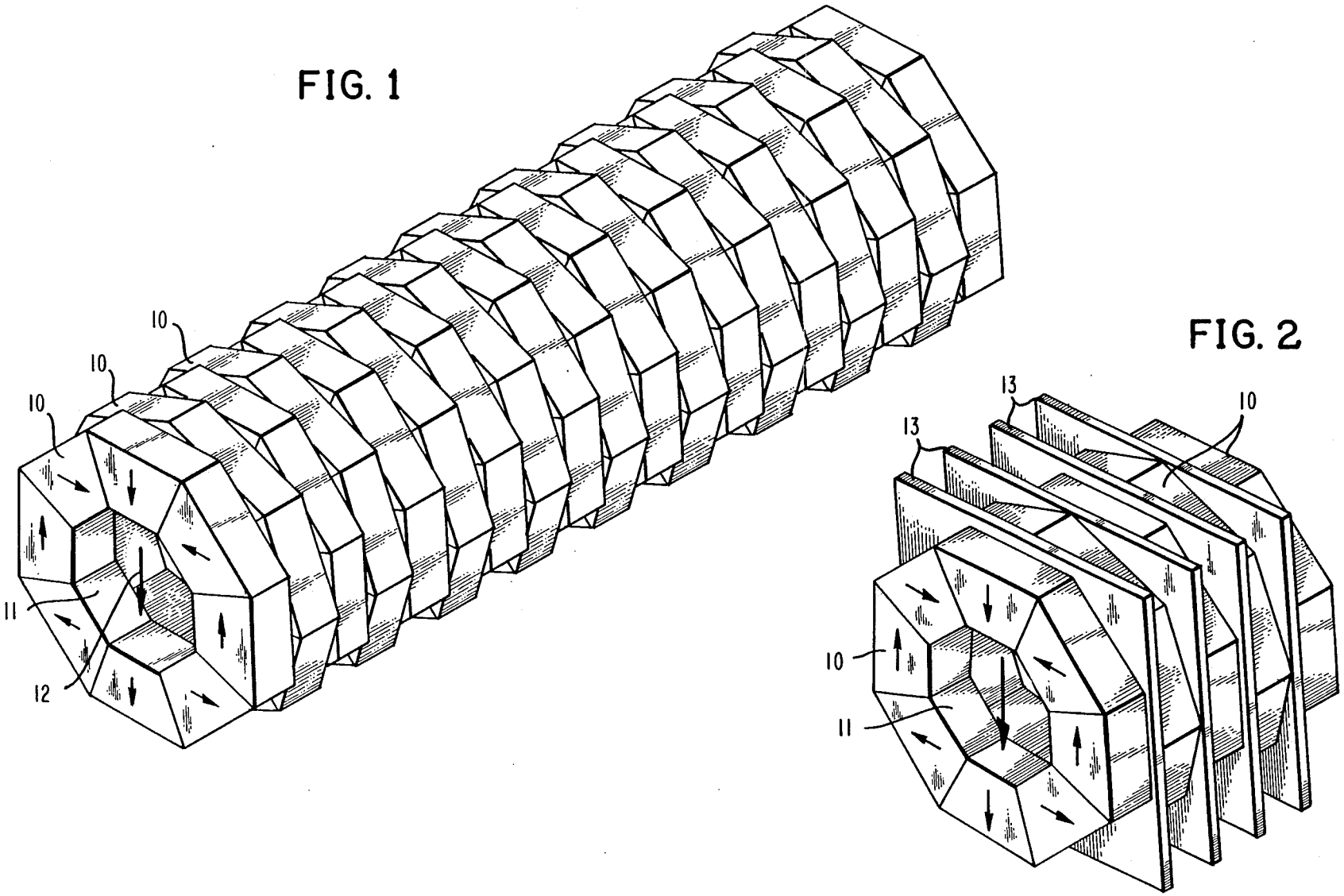
FIG. 1 shows an actual magnet array comprising a series of octagonal HCFS structures with an angular displacement between successive structures.
FIG. 2 shows an abbreviated magnet array comprising a series of octagonal HCFS structures with an angular displacement between successive structures, further including interspersing superconducting sheets between successive segments.

FIG. 1 shows a multiplicity of octagonal HCFS structures 10, each having a generally centrally disposed hole 11 arranged in longitudinal array with the respective holes 11 concentrically in registration, and with each respective structure 10 displaced radially a preselected amount from its adjacent structure so that the magnetic orientation of the respective segments as the field is defined longitudinally through the extended passage goes through a twisting locus from the proximal end towards and to the distal end. The net effect of the arrangement is the production of a helically varying or twisting magnetic field through the array of holes 11 and the array can be termed a "twister". Along with this transverse magnetic field denoted by the arrow, 12, there exists a longitudinal component of magnetic field which results from the twisting, thereby weakening the transverse magnetic field.

FIG. 2 displays a preferred embodiment of the invention wherein a multiplicity of octagonal HCFS structures 10, each having a generally centrally disclosed hole 11 arranged in longitudinal array with the respective holes 11 concentrically in registration, and with each respective structure 10 displaced radially a preselected amount from its adjacent segment, are separated by superconducting sheets 13. The sheets 13 as shown in the figure are at least peripherally coextensive with the HCFS structures and can extend beyond the flux source structures, 10, in one or more directions. It is necessary that they be not less in extent than the structures 10. This figure represents a close approximation of the ideal HCFS array (which is not feasible to construct).

The superconducting sheets shown in the figure are typically quite thin. In practice, the essential requirement is that the sheets be thicker than the penetration depth of the specific superconducting material used. Materials such as tin, lead, niobium, tantalum among others are known to be superconducting below a distinct critical temperature. New ceramic-type materials have been recently developed in the field of superconductivity and are capable of achieving the superconducting state at critical temperatures above 77° K., the boiling point of liquid nitrogen. One such compound $RBa_2Cu_3O_{9-y}$ (where R stands for a transition metal or rare earth ion and y is a number less than 9, preferable $2.1\pm0.05$) has demonstrated superconductive properties above 90° K. Forming techniques include plasma spraying, sputtering, epitaxial film growing, etc. These materials and forming processes are merely exemplary and in no way limit the superconductivity material selected for the sheets, and the manner thereof in which the material is formed.

A bore hole is drilled through each superconducting sheet 13 along the central axis of the array thereby providing a passage in the working central cavities of the HCFS array through which an electron beam can travel. The array can be termed a "pyx twister".

In prior art twisters, the magnetic field was weakened by distortion. Distortion was caused by (1) the bending of the field lines of the end faces of open HCFS, and (2) interference with incoming flux leaking from neighboring open segments. The longitudinal component of magnetic field present due to the twisting effect, further increased with increasing frequency. By interspersing superconducting sheets between successive HCFS structures, the longitudinal magnetic field was prevented and distortion problems were overcome.

A superconducting surface prevents the penetration of a magnetic field. The addition of the superconducting sheets confines outward flux leakage from each working cavity of the array preventing flux penetration from neighboring cavities and not permitting the bending of the field lines at the end faces which would have occurred without the addition of the sheets. In this manner, the effect of interference from adjacent segments is eliminated, leaving the field within each pyx cavity unaffected by its neighbors. Each cavity thereby acts separately as one extremely long cavity, producing an intense transverse magnetic field, the longitudinal component becoming essentially nil. Consequently, the field is made substantially uniform.

Alternately, one may comprehend this effect through the concept of diamagnetic mirrors. The superconducting sheets 13 magnetically mirror the field abutting the surfaces of the sheets, thereby providing the appearance of an infinitely long cavity in both directions of each HCFS structure. Theoretically, a HCFS is infinitely long having uniform field strength. In essence, this invention magnetically creates a theoretical HCFS twister with uniform field strength through the utilization of superconducting plates.

Although octagonal HCFS structures are figuratively shown with interspersed superconducting sheets, rectangular shaped structures may also be employed in the present invention. More complex structures of HCFS design having cross sections of circles, sixteen sides, thirtytwo sides etc., may also be used in accordance with the present invention. Other components of the twister well known to those skilled in the art of design of such devices have been eliminated from the discussion. Also, greater or fewer magnetic pyxes may be desirable in any given application with no limit on the number of degrees of the angle of displacement nor the frequency of twist.

What is claimed is:

1. A magnetic structure comprising a plurality of hollow substantially cylindrical flux sources, each having a generally centrally disposed hole therethrough, arranged concentrically on an elongate axis with said holes in substantial registration along said axis to define an elongate axial passage extending through said structure; each respective hollow substantially cylindrical flux source displaced radially on said elongate axis from its respective adjacent source so as to produce a helically oriented magnetic field; and superconducting sheets interspersed between adjacent flux sources and also covering the end faces of the array.

2. A magnetic structure as defined in claim 1 wherein each superconducting sheet has an axial disposed hole to permit passage of an electron beam through the entire structure.

3. A magnetic structure defined in claim 2 wherein the superconducting sheets are at least peripherally coextensive with the flux sources.

* * * * *